3,320,081
STARCH AND N-HYDROXYALKYL AMIDES
Austin H. Young, Decatur, Ill., Marvin T. Tetenbaum, Petersburg, Va., and Richard J. Pratt, Menomonie Falls, Wis., assignors to A. E. Staley Manufacturing Company, Decatur, Ill., a corporation of Delaware
No Drawing. Filed Nov. 20, 1963, Ser. No. 325,145
22 Claims. (Cl. 106—210)

This invention relates to amylose plasticized with water-soluble N-hydroxyalkyl amides.

For years amylose films have been studied from a more or less academic point of view since amylose was not commercially available. Now that amylose has become available in sizeable quantities, research on amylose films has increased. One of the major problems, which has slowed the commercialization of amylose films, is that the flexibility and elongation of amylose films is dependent upon the water content of the amylose film. At low relative humidity, water is lost by evaporation, and the film becomes extremely brittle and its percent elongation decreases. Even at 50% relative humidity, the film has a low percent elongation and poor flexibility. For the most part polyhydric alcohols, such as glycerol and sorbitol, have been used as amylose plasticizers. However, these plasticizers are humidity dependent. The object of this invention is to provide a new class of amylose plasticizers.

We have now found that N-hydroxyalkyl amides are good plasticizers for shaped amylose objects, such as amylose films. Absent the hydroxyalkyl group, the amides exhibit little or no plasticizing effect on amylose. These plasticizers can be represented by the formula:

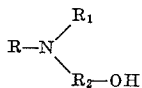

wherein R is an acyl group such as formyl, acetyl, propionyl, butyryl, glycolyl, lactyl, 3-hydroxybutyryl, gluconyl, methylsulfonyl, hydroxyethyl sulfonyl, hydroxyethyl phosphoryl, etc.; $R_1$ is hydrogen or an alkyl group such as methyl, ethyl, propyl, butyl, 2-hydroxyethyl, 2-hydroxypropyl, cyanoethyl, etc.; and $R_2$ is an alkylene group such as ethylene, propylene, butylene, etc. Suitable plasticizers represented by the above formula include N-hydroxyethyl formamide, N,N-di(hydroxyethyl) acetamide, N-hydroxyethyl-N-methyl butyramide, N-hydroxyethyl lactamide, N,N - di(hydroxyethyl) glyconamide, N - hydroxyethyl - N,N',N',N'',N'' - pentamethyl phosphoramide, N,N,N',N',N'',N'' - hexahydroxyethyl-phosphoramide, N-hydroxyethyl-N-methyl methane sulfonamide, etc.

The weight ratio of amylose plasticizer to amylose (dry solids basis) can range from about 5:95 to 60:40 when the N-hydroxyalkyl amide is the sole plasticizer. Under most conditions the N-hydroxyalkyl amide is preferably used in concentration of from about 10 to 40 parts by weight with correspondingly 90 to 60 parts by weight amylose.

For the purpose of this invention, the term "amylose" refers to the amylose resulting from the separation of the amylose and amylopectin components of starch, or the whole starch which is composed of at least 50% amylose. Commercially available sources of amylose include "Nepol" amylose (the amylose fraction of corn starch), "Superlose" (the amylose fraction of potato starch), "Amylomaize" or "Amylon" (high-amylose corn starch containing approximately 54% amylose), "Amylon VII" (high-amylose corn starch containing up to 70% amylose), etc. Amylose films, fibers and tubes of high-amylose corn starch can be simulated by mixing corresponding concentrations of separated amylose with separated amylopectin. Preferably, however, the amylopectin content of the amylose is less than 20% by weight. In general, the higher the concentration of amylose the better the tensile strength and flexibility of the shaped object. Various derivatives of amylose (amylose acetate, hydroxyethyl amylose and hydroxypropyl amylose) such as those described in U.S. Patent 3,038,895 can also be employed. Preferably, the amylose derivative can be dissolved in water and has a D.S. less than one.

Amylose films can be prepared by any of the prior art techniques, such as those described in any of U.S. Patents 2,603,723 to Wolff et al., 2,903,336 to Hiemstra et al., 2,973,243 to Kudera, 3,030,667 to Kunz, etc. In these processes the amylose plasticizer (in either the dry form or dissolved in water) is added to a suitable aqueous solution of amylose, dissolver, for example, in aqueous alkali, in hot water at essentially neutral pH, etc. The amylose solution is then cast on a suitable substrate, such as a moving belt, or extruded into a coagulating (acidic or salt) bath. In this way the amylose film is recovered from the aqueous solution by the precipitation of the amylose film from the solvent or by evaporation of the solvent during drying.

These techniques can be employed to prepare self-supporting films, which are large in two dimensions and small in the third dimension, i.e. the two dimensions are at least 100 times larger than the third dimension. The previously prepared films can also be laminated to a suitable base or the film can be cast or otherwise applied directly on a suitable substrate, e.g. cellulose (cellophane, paper), metal, etc. A particularly useful method of coating paper with a grease, resistant amylose layer is described in detail in commonly assigned application Ser. No. 296,660, filed July 22, 1963.

Amylose film can also be prepared by extruding superficially dry amylose and N-hydroxyalkyl amide. By superficially dry, we mean that essentially all the amylose plasticizer has been absorbed by the amylose prior to the extrusion step. This technique is described in detail in commonly assigned application Ser. No. 244,127, filed Dec. 12, 1962.

Any of the above extrusion techniques can be employed to prepare amylose fibers and amylose tubes.

The following examples are merely illustrative and are not to be construed as limiting the scope of our invention. All of the data in the examples is an average of five determinations.

*Example I*

An aqueous solution of corn amylose was prepared by pumping an aqueous slurry of 8 grams defatted corn amylose (D.S.B.) in 72 grams of water through a 35 foot long, ⅛" I.D. coil of tubing heated to 150° C. and having a dwell time of 2 minutes. The aqueous solution was cooled to 95° C. and placed in a preheated Dewar flask, which contained 2 grams of N-2-hydroxyethyl formamide (95° C.). The solution was stirred for 60 seconds and then cast on a lecithin-coated plate at 30° C. using a doctor blade preheated to 95° C. The film gelled rapidly as it cooled to room temperature. The same technique was employed for preparing an amylose film having no plasticizer, an amylose film containing 20% by weight glycerol, an amylose film containing 20% by weight N-2-hydroxyethyl acetamide and an amylose film containing 20% by weight N-2-hydroxyethyl lactamide. Each film was stripped from the glass plate and stored at 23° C. and 50% relative humidity. The percent elongation and elastic modulus of the films were determined after 1 and 8 weeks. The results are set forth below in Table I where EM stands for elastic modulus in p.s.i. and E stands for percent elongation.

TABLE I

| Properties Tested | Plasticizer | Thickness of Film in Mils | Age of Film in Weeks — 1 | Age of Film in Weeks — 8 |
|---|---|---|---|---|
| EM | None | 0.8 | 490,000 | 430,000 |
| E | | | 5 | 6 |
| EM | Glycerol | 0.9 | 208,000 | 298,000 |
| E | | | 12 | 9 |
| EM | N-2-hydroxyethyl formamide | 0.9 | 239,000 | 293,000 |
| E | | | 12 | 10 |
| EM | N-2-hydroxyethyl acetamide | 0.8 | 183,000 | 227,000 |
| E | | | 19 | 14 |
| EM | N-2-hydroxyethyl lactamide | 0.9 | 190,000 | 207,000 |
| E | | | 6 | 4 |

The above table illustrates that the N-hydroxyalkyl amides of this invention are as efficient or more efficient in lowering the elastic modulus of amylose films when compared with glycerol which is conventionally used. The table also illustrates that N-hydroxyethyl formamide and N-hydroxyethyl acetamide tend to increase the percent elongation of amylose films more than glycerol.

Example II

This example illustrates that N-hydroxyethyl lactamide is a better amylose plasticizer at low humidity than glycerol. Example I was repeated except that undefatted corn amylose was used instead of defatted corn amylose and the amylose films were aged at 23° C. and 23% relative humidity and at 23° C. and 50% relative humidity. The results are set forth below in Table II where RH stands for relative humidity.

TABLE II

| Properties Tested | Plasticizer | 20% — 23% RH | 20% — 50% RH | 30% — 23% RH | 30% — 50% RH |
|---|---|---|---|---|---|
| EM | Glycerol | 367,000 | 266,000 | 221,000 | 100,000 |
| E | | 8 | 7 | 21 | |
| EM | N-2-hydroxyethyl lactamide | 326,000 | 80,500 | 183,000 | 44,700 |
| E | | 16 | 25 | 37 | 38 |

Example III

An undefatted corn amylose film containing 20% by weight of N,N-di(2-hydroxyethyl) formamide was prepared by the method of Example I. After 1 week at 23° C. and 50% relative humidity the film had an elastic modulus of 151,000 p.s.i. and 26% elongation.

Example IV

Undefatted corn amylose films containing 20% by weight, 30% by weight and 40% by weight of N,N-di(2-hydroxyethyl) acetamide were prepared by the method of Example I. After 1 week at 23° C. and 50% relative humidity the films were tested. The film containing (A) 20% by weight plasticizer had an elastic modulus of 207,000 p.s.i. and 25% elongation, (B) 30% by weight plasticizer had an elastic modulus of 69,200 p.s.i. and 39% elongation and (C) 40% by weight plasticizer had an elastic modulus of 33,200 p.s.i. and 26% elongation.

Example V

Undefatted corn amylose films containing 20% by weight and 30% by weight N,N-di(2-hydroxyethyl) methane sulfonamide were prepared by the method of Example I. After 1 week at 23° C. and 50% relative humidity the films were tested. The film containing (A) 20% by weight plasticizer had an elastic modulus of 209,000 p.s.i. and 7.2% elongation and (B) 30% by weight plasticizer had an elastic modulus of 74,900 p.s.i. and 18% elongation.

Example VI

Undefatted corn amylose films containing 20% by weight and 32% by weight N-methyl-N-2-hydroxyethyl methane sulfonamide were prepared by the method of Example I. After 1 week at 23° C. and 50% relative humidity the films were tested. The film containing (A) 20% by weight plasticizer had an elastic modulus of 221,000 p.s.i. and 12% elongation and (B) 32% by weight plasticizer had an elastic modulus of 86,000 p.s.i. and 26% elongation.

After 4 months at 23° C. and 50% relative humidity the film containing (A) 20% by weight plasticizer had an elastic modulus of 239,000 p.s.i. and 4% elongation and (B) 32% by weight plasticizer had an elastic modulus of 95,500 p.s.i. and 16% elongation.

Example VII

Undefatted corn amylose films containing 20% by weight and 30% by weight N-(2-hydroxyethyl)-N,N',N',N'',N''-pentamethyl phosphoramide were prepared by the method of Example I. After 1 week at 23° C. and 50% relative humidity the film (A) containing 20% plasticizer had an elastic modulus of 132,000 p.s.i. and 26% elongation and (B) containing 30% plasticizer had an elastic modulus of 26,000 p.s.i. and 32% elongation.

After 4 months at 23° C. and 50% relative humidity the film containing 20% plasticizer had an elastic modulus of 166,000 p.s.i. and 33% elongation.

While this invention is principally directed to plasticizing amylose with water-soluble N-hydroxyalkyl amides, the N-hydroxyalkyl amides can be used as solvents, swelling agents or plasticizers for starch. The term "starch" is used in its generic sense to be inclusive of any native starch, modified native starch or derivatized native starch. Corn starch, high amylose corn starch, tapioca starch, wheat starch, rye starch, potato starch, sago starch, waxy corn starch and the amylose and amylopectin fractions therefrom are representative of the various native starches and starch fractions therefrom that can be used with the N-hydroxyalkyl amides. Any of these starches may be modified by enzyme treatment, by oxidation with alkaline hypochlorite or by hydrolysis with acid, for example, or derivatized by treatment with ethylene oxide, propylene oxide, acetic anhydride, vinyl acetate, choloroacetic acid, etc. The N-hydroxyalkyl amides can be used (A) in a concentration as low as 1 part by weight per each 19 parts by weight starch in plasticizing starch or in 10 to 20 parts by weight or more per each part by weight starch when the N-hydroxyalkyl amides are employed as a solvent for the starch. The N-hydroxyalkyl amides are particularly useful as swelling agents in the extrusion pasting of starch described in commonly assigned application Ser. No. 100,354, filed Apr. 3, 1961, now Patent No. 3,137,592.

Since many embodiments of this invention may be made and since many changes may be made in the embodiments described, the foregoing is to be interpreted as illustrative only and our invention is defined by the claims appended hereafter.

We claim:

1. A composition comprising an amylosic material containing at least 50% by weight amylose wherein the amylose portion of said amylosic material is present in the form of a material selected from the group consisting of the separated amylose fraction of whole starch, whole starch containing at least 50% by weight amylose and mixtures thereof, plasticized with a plasticizing concentration of a water-soluble N-hydroxyalkyl amide having from 2 to 4 carbon atoms in said hydroxyalkyl group.

2. The composition of claim 1, wherein the weight ratio of said water-soluble N-hydroxyalkyl amide to amylosic material ranges from 5:95 to 60:40.

3. The composition of claim 2, wherein said amylosic material comprises the separated fraction of whole starch.

4. The composition of claim 2, wherein said amylosic material comprises whole starch containing at least 50% amylose.

5. The composition of claim 1, wherein the N-hydroxyalkyl amide comprises a N-hydroxyalkyl carbonamide.

6. The composition of claim 1, wherein the N-hydroxyalkyl amide comprises a N-hydroxyalkyl sulfonamide.

7. The composition of claim 1, wherein the N-hydroxyalkyl amide comprises a N-hydroxyalkyl phosphoramide.

8. The composition of claim 2, wherein said N-hydroxyalkyl amide comprises an N-hydroxyethyl lactamide.

9. The composition of claim 2, wherein said N-hydroxyalkyl amide comprises an N-hydroxyethyl acetamide.

10. The composition of claim 2, wherein said N-hydroxyalkyl amide comprises an N-hydroxyethyl formamide.

11. The composition of claim 10, wherein said N-hydroxyethyl formamide is N,N-di(2-hydroxyethyl) formamide.

12. The composition of claim 2, wherein said N-hydroxyalkyl amide comprises an N-hydroxyethyl methane sulfonamide.

13. The composition of claim 2, wherein said hydroxyalkyl amide comprises an N-hydroxyethyl phosphoramide.

14. A continuous amylosic film comprising an amylosic material containing at least 50% by weight amylose wherein the amylose portion of said amylosic material is present in the form of a material selected from the group consisting of the separated amylose fraction of whole starch, whole starch containing at least 50% by weight amylose and mixtures thereof, plasticized with a plasticizing concentration of a water-soluble N-hydroxyalkyl amide having from 2 to 4 carbon atoms in said hydroxyalkyl group.

15. The film of claim 14, wherein said N-hydroxyalkyl amide comprises at least one compound selected from the group consisting of an N-hydroxyalkyl carbonamide, an N-hydroxyalkyl phosphoramide and an N-hydroxyalkyl sulfonamide.

16. The film of claim 15, wherein said amylosic material comprises the separated portion of whole starch.

17. The film of claim 16, wherein said N-hydroxyalkyl amide comprises an N-hydroxyethyl lactamide.

18. The film of claim 16, wherein said N-hydroxyalkyl amide comprises an N-hydroxyethyl formamide.

19. The film of claim 16, wherein said N-hydroxyalkyl amide comprises an N-hydroxyethyl acetamide.

20. The film of claim 16, wherein said N-hydroxyalkyl amide comprises an N-hydroxyethyl phosphoramide.

21. A composition comprising starch and N-hydroxyalkyl phosphoramide having from 2 to 4 carbon atoms in said hydroxyalkyl group in a weight ratio of starch to N-hydroxyalkyl phosphoramide of 19:1 to 1:20.

22. A composition comprising starch and N-hydroxyalkyl sulfonamide having from 2 to 4 carbon atoms in said hydroxyalkyl group in a weight ratio of starch to N-hydroxyalkyl sulfonamide of 19:1 to 1:20.

References Cited by the Examiner
UNITED STATES PATENTS

| | | | |
|---|---|---|---|
| 2,146,873 | 2/1939 | Wilmanns et al. | 106—210 X |
| 2,686,732 | 8/1954 | Montgomery et al. | 106—154 X |
| 3,117,014 | 1/1964 | Klug | 260—233.3 X |

ALEXANDER H. BRODMERKEL, Primary Examiner

L. B. HAYES, Assistant Examiner.